2 Sheets—Sheet 1.

J. D. SECHLER.
Milk-Strainer.

No. 198,905. Patented Jan. 1, 1878.

WITNESSES
Franck L. Ourand
Frank Galt

INVENTOR
Jacob D. Sechler
Alexander Mason
ATTORNEYS

2 Sheets—Sheet 2.

J. D. SECHLER.
Milk-Strainer.

No. 198,905. Patented Jan. 1, 1878.

WITNESSES
F. L. Ourand
Frank Galt

INVENTOR
Jacob D. Sechler
Alexander Mason
ATTORNEYS

N. PETERS, PHOTO-LITHOGRAPHER, WASHINGTON, D. C.

UNITED STATES PATENT OFFICE.

JACOB D. SECHLER, OF HUNTERTOWN, INDIANA.

IMPROVEMENT IN MILK-STRAINERS.

Specification forming part of Letters Patent No. 198,905, dated January 1, 1878; application filed October 20, 1877.

*To all whom it may concern:*

Be it known that I, JACOB D. SECHLER, of Huntertown, in the county of Allen, and in the State of Indiana, have invented certain new and useful Improvements in Combination Milk-Strainer and Funnel; and do hereby declare that the following is a full, clear, and exact description thereof, reference being had to the accompanying drawings, and to the letters of reference marked thereon, making a part of this specification.

The nature of my invention consists in the construction of a combined milk-strainer and funnel, as will be hereinafter more fully set forth.

In order to enable others skilled in the art to which my invention appertains to make and use the same, I will proceed to describe its construction and operation, referring to the annexed drawings, in which—

Figure 1:
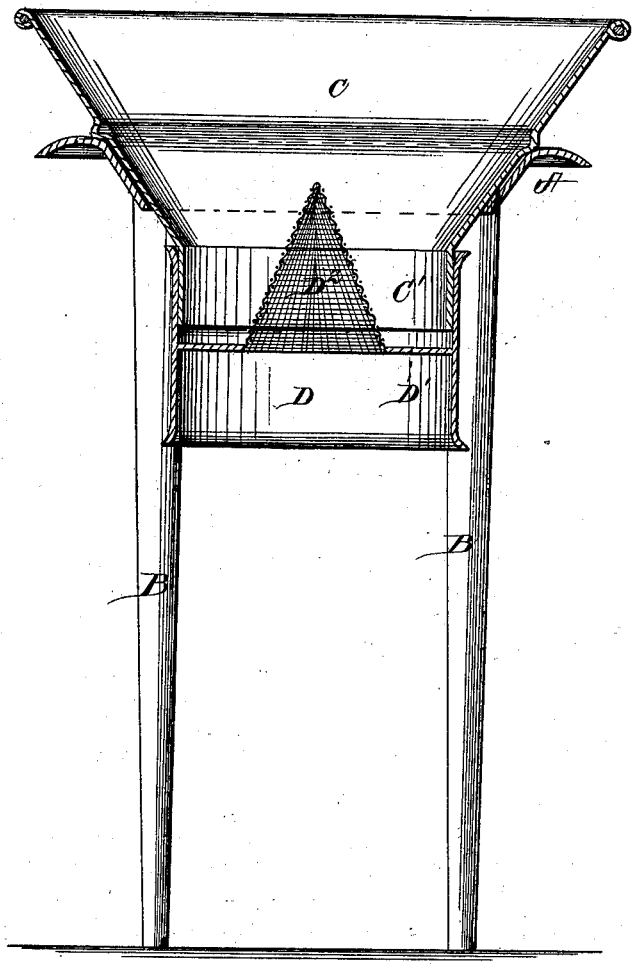

Figure 1 is a central section of my milk-strainer and funnel held in a stand; and Figs. 2, 3, 4, and 5 show other attachments that may be used with the same.

The stand consists simply of a rim, A, with legs B B, of suitable height.

C represents a funnel-shaped reservoir, of suitable dimensions, having a rim, C', projecting downward from around the circular opening in the lower smaller end of the reservoir. On this rim is placed a metal band, D, of suitable width, having an interior horizontal plate or diaphragm, $D^1$, with a circular opening in the center, from which projects upward a conical strainer, $D^2$, made of wire-cloth. This constitutes the combined funnel and milk-strainer.

The upwardly-projecting conical strainer $D^2$ is of particular and great utility, for, instead of pouring the milk on a flat or concave surface, by which the sediment is forced through by the fluid itself, it strikes the top and sides of the cone, letting the milk pass through very rapidly, while the sediment, hair, or other unavoidable small trash that sometimes falls into the pail during milking is thrown to the side of the reservoir, by which a much better job is done.

The great surface for letting the milk pass through is another very important feature.

The strainer $D^2$ is intended to be removable, so that it can be replaced by another, if desired.

Figure 2:
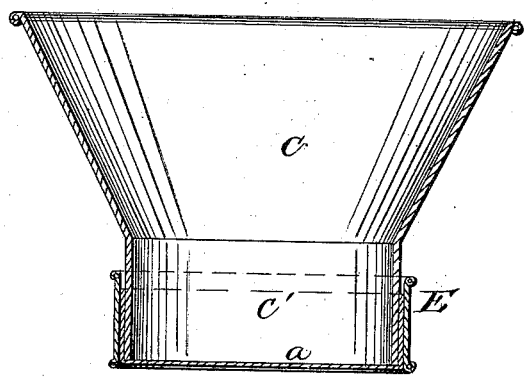
Figure 3:
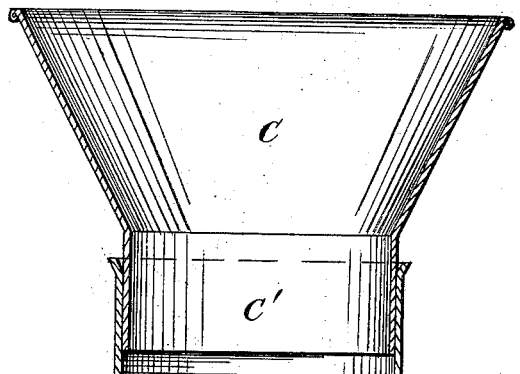
Figure 5:
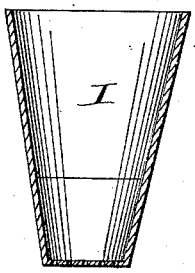
Figure 4:
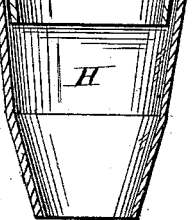

By removing the band and strainer D $D^2$, and applying a plain band, E, on the rim C' of the reservoir, a cloth, a, can be held taut under the reservoir for a cloth strainer, as shown in Fig. 2.

G' represents a smaller funnel-shaped device, to be applied on the end of the reservoir C', to be used for canning fruit. By attaching a still smaller funnel, H, on the end of the part G, a funnel for general purposes is formed; and on the bottom of this part may be attached a filtering-cup, I. In all cases the reservoir C is supported in the stand A B.

I do not broadly claim a conical strainer in a milk-strainer, as I am aware that such is not new.

Having thus fully described my invention, what I claim as new, and desire to secure by Letters Patent, is—

In combination with the rim A, supported upon legs B B, the removable reservoir C C', removable band D, having partition $D^1$, and the conical strainer $D^2$, all constructed substantially as and for the purposes herein set forth.

In testimony that I claim the foregoing I have hereunto set my hand this 25th day of July, 1877.

JACOB D. SECHLER.

Witnesses:
W. J. KERR,
G. L. BITTINGER.